United States Patent [19]
Kollep et al.

[11] Patent Number: 6,026,732
[45] Date of Patent: Feb. 22, 2000

[54] HOLDER AND HOUSING DEVICES FOR CONTAINING AND RELEASING CAPSULES FOR DRINK PREPARATION

[75] Inventors: Alexandre Kollep, Pully; Petr Masek, Granges, both of Switzerland

[73] Assignee: Nestec S.A., Vevey, Switzerland

[21] Appl. No.: 09/114,606

[22] Filed: Jul. 13, 1998

[30] Foreign Application Priority Data

Jul. 14, 1997 [EP] European Pat. Off. ............ 97202208

[51] Int. Cl.[7] .............................. A47J 31/06; A47J 31/40
[52] U.S. Cl. ............................................ 99/295; 99/302 R
[58] Field of Search .................... 99/295, 302 R, 99/302 P

[56] References Cited

U.S. PATENT DOCUMENTS

| | | | |
|---|---|---|---|
| 4,846,052 | 7/1989 | Favre et al. | 99/295 |
| 5,072,661 | 12/1991 | Kondo | 99/295 X |
| 5,398,595 | 3/1995 | Fond et al. | 99/295 |
| 5,402,707 | 4/1995 | Fond et al. | 99/295 |

FOREIGN PATENT DOCUMENTS 242556  10/1987  European Pat. Off. .

*Primary Examiner*—Reginald L. Alexander
*Attorney, Agent, or Firm*—Vogt & O'Donnell, LLP

[57] ABSTRACT

Devices for holding and positioning capsules which have a cup, cover and lid structure and which contain a substance for preparation of a drink by extraction under pressure include a hollowed housing device, a hollowed holder device and an extraction plate for flow of the extracted drink from the capsule. The holder device includes an element member which extends from a holder wall into the interior at a position so that upon placement of a capsule in the holder device hollowed interior so that the cover and lip are adjacent the extraction plate, the lip passes by the retention element member and is retained between the member and extraction plate, and the housing and holder devices also are configured so that for pressure extraction, the housing has a periphery edge positionable for contacting the capsule lip so that a seal is formed.

14 Claims, 5 Drawing Sheets

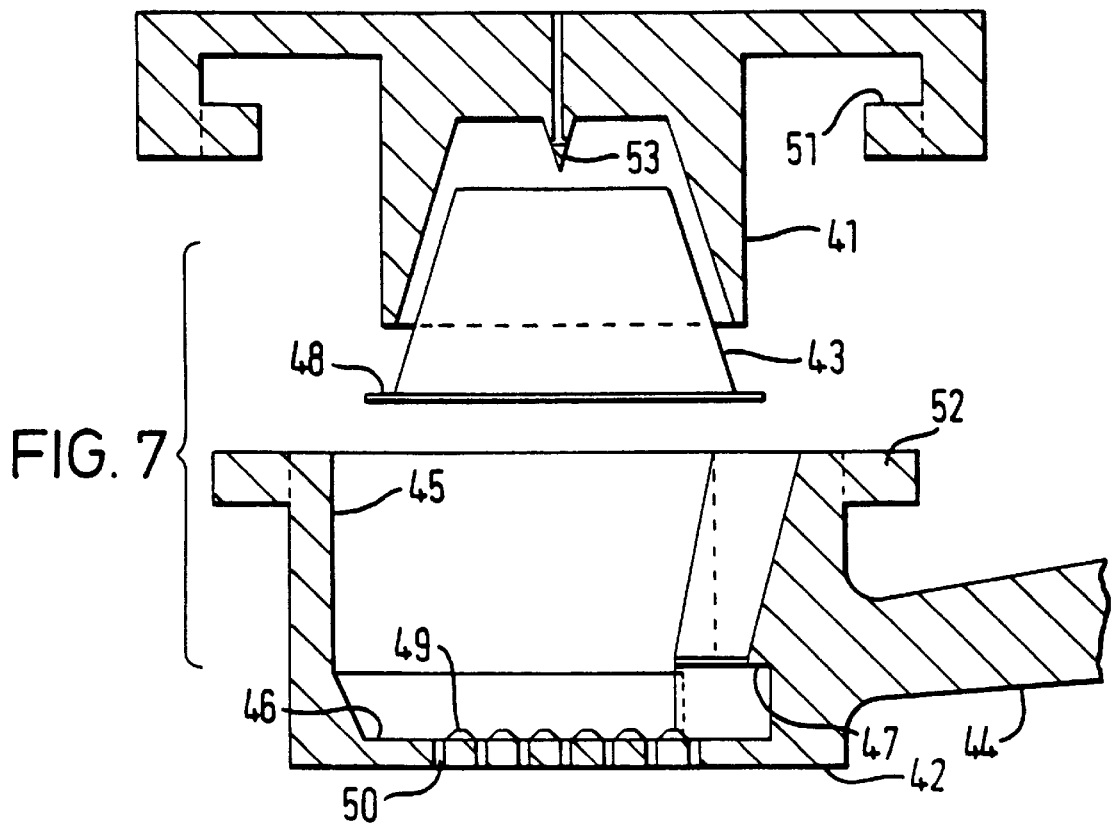
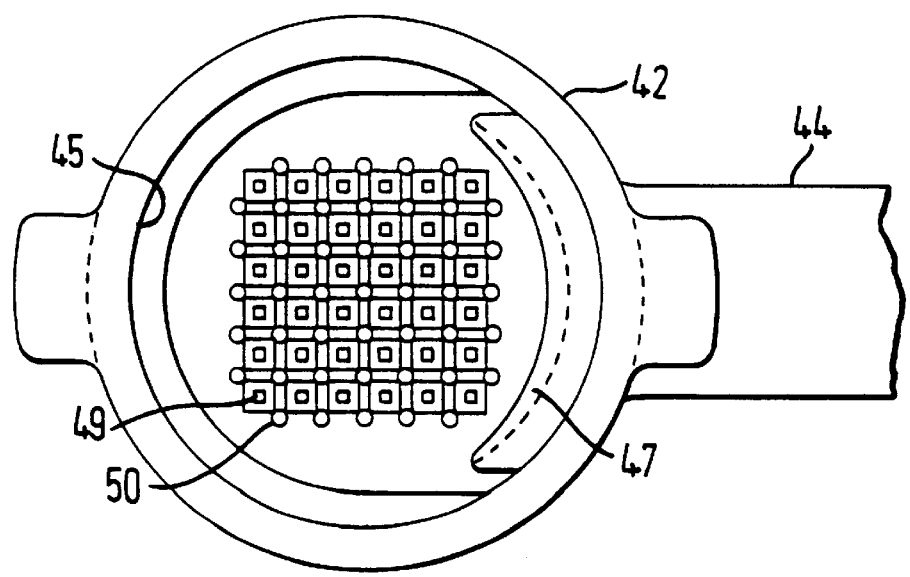

HOLDER AND HOUSING DEVICES FOR CONTAINING AND RELEASING CAPSULES FOR DRINK PREPARATION

BACKGROUND OF THE INVENTION

The present invention relates to devices employed in connection with extraction of substances for preparation of beverage drinks by extraction under pressure and particularly to preparation of a drink by extraction, under pressure, of a substance contained by a capsule, or cartridge, which comprises a cup, cover and lip and more particularly to holder and housing devices for holding and positioning the capsule for the pressure extraction of the substance.

A device is already known which makes it possible to carry out extraction of a capsule in a pressurized device. European Patent Application Publication No. 0 242 556 relates to a device for making up a drink by extraction of a substance contained by a capsule in a holder for a coffee machine and comprising a housing interacting with the holder. The housing includes, on its outer part, a ring and a spring which make it possible, after extraction from the capsule, to guarantee satisfactory release of the capsule from the cylindrical holder body. The drawback of this device is that the presence of the ring and of the spring make the device expensive, firstly because of the presence of the two ring and spring components and secondly, because these components have to be fitted, which requires an assembly handling operation. Furthermore, they may become clogged during use and in the worst case, cease to eject the capsule.

SUMMARY OF THE INVENTION

The object of the present invention is to be able to set up a system which makes it possible to permit satisfactory release (or ejection) of the capsule after extraction, but with a simpler and thus less expensive and more reliable device.

The present invention provides devices for making up a drink by extraction of a substance contained by a capsule comprising a cup and a lip arranged in a capsule-holder assembly for a coffee machine, the devices comprising:

a substantially cylindrical housing which has an inner form which substantially matches the outer form of the cup of a capsule containing a substance for extraction and which includes, in its upper part, along the axis of the housing, a member for injecting water into the capsule and a means providing a link with the water outlet of the machine, and in its lower part, an annular edge; and a holder assembly forming a cylindrical casing and including a extraction plate in the bottom of the casing, the assembly being provided in order to be held under the housing so that the annular edge of the housing interacts, during extraction, with the perimeter of the extraction plate, and the lower part of the holder assembly includes, on the side and close to the extraction plate, at least one means for retaining the lip of a capsule.

It is thus possible, according to the present invention, to provide housing, for accommodating a capsule for extraction, which does not include a ring and a spring.

DETAILED DESCRIPTION OF THE INVENTION

In accordance with use and operation of the devices of the present invention, a capsule containing a substance for preparation of a drink by extraction is placed in the holder which comprises a retention means in accordance with the present invention. At this stage, the lip of the capsule rests via its own weight against the retention means. However, the capsule weight alone is insufficient for the lip of the capsule to pass over the retention means. The holder is then inserted into the housing. During this movement, or at the latest, during locking of the holder to the cylindrical body, the lip of the capsule is forced past the retention means. This takes place either without plastic deformation of the capsule but with elastic deformation of the retention means, or with plastic deformation of the capsule and without elastic deformation of the retention means. The coffee machine is then turned on in order to extract the substance contained by the capsule and to obtain the desired drink.

After the extraction, the holder is unlocked. At this stage, the capsule is wedged in the housing, and the retention means, which is secured to the holder, bears on the lip of the capsule without yielding. When the holder is removed manually, the capsule is entrained and therefore ejected from the housing. It then suffices to turn the holder upside down in order to cause the used capsule to fall out, owing to the fact that the retention means is arranged only on one side (a part of the circumference) and the capsule can tilt on the opposite side and release itself from the retention means. The retention means thus makes it possible to readily release the capsule from the housing, and since this retention means extends over only part of the perimeter of the extraction plate, it is possible then to make it fall easily into a waste container.

As mentioned above in the case of the description of the operating method, it may be advantageous for the retention means to have a degree of elasticity; and it is consequently preferable for the retention means to be, for example, made from plastic material or from rubber, or from any other elastic material.

The retention means is placed in the bottom of the holder casing, at extraction-plate level, on the vertical part of the casing. In a preferred embodiment, there are two retention means in the form of lugs forming arcs of a circle, as defined by a length of the lug, each lug having a length such that it forms an arc of a circle which is an arc of less than 30°, preferably less than 10°. In a further embodiment, the retention means has the form of a rim in the form of an arc of an off-centered circle having a length such that the arc is less than 180°, preferably less than 90°.

The extraction plate has the form of a plate with raised elements and hollowed-out elements with holes for the flow of an extracted drink, such as coffee. The raised elements are, for example, pyramids or frustums of a pyramid; and in this embodiment, the capsule for extraction has a cup and a lip with a cover which has no weakening line. During extraction, it is the rise in pressure in the capsule which causes the cover to be pressed against the raised elements and which gives rise to tearing of the cover against the raised elements.

The extraction plate may also have the form of a plate with only flow holes. In this case, the capsule for extraction always has a cup, a lip and a cover, but the cover has weakening zones to allow extraction under pressure.

The holder assembly may have the form of a single component or of two components. In the former case, the holder includes the extraction plate, and the means for retaining the lip of the cover forms an integral part of the holder itself. In the latter case, the holder assembly comprises the actual holder, a plate support placed in the holder and the extraction plate. The plate support is normally conical in form towards the bottom and cylindrical in form towards the top, the means for retaining the lip of the capsule being in the cylindrical part. The description of the figures gives a specific representation of this type of arrangement.

The means linking the housing with the water outlet of the machine is a bayonet system, which greatly facilitates assembly and dismantling of the cylindrical body.

As already mentioned above, the retention means may be, and preferably is, made from an elastic material, and the simplest solution is to make the entire holder assembly from plastics material, and possibly also the housing.

Compared with a capsule holder made from metal, this has the further consequence that the cost of the machine is genuinely reduced. Polyamide, for example, is envisaged as the plastics material.

The remainder of the description is given with reference to the drawing figures.

BRIEF DESCRIPTION OF THE DRAWING FIGURES

FIG. 7 is an exploded diagrammatic representation of a device according to a third embodiment of the invention.

FIG. 8 is a further representation of the holder of the FIG. 7 embodiment.

DETAILED DESCRIPTION OF THE DRAWING FIGURES

Figure 1:
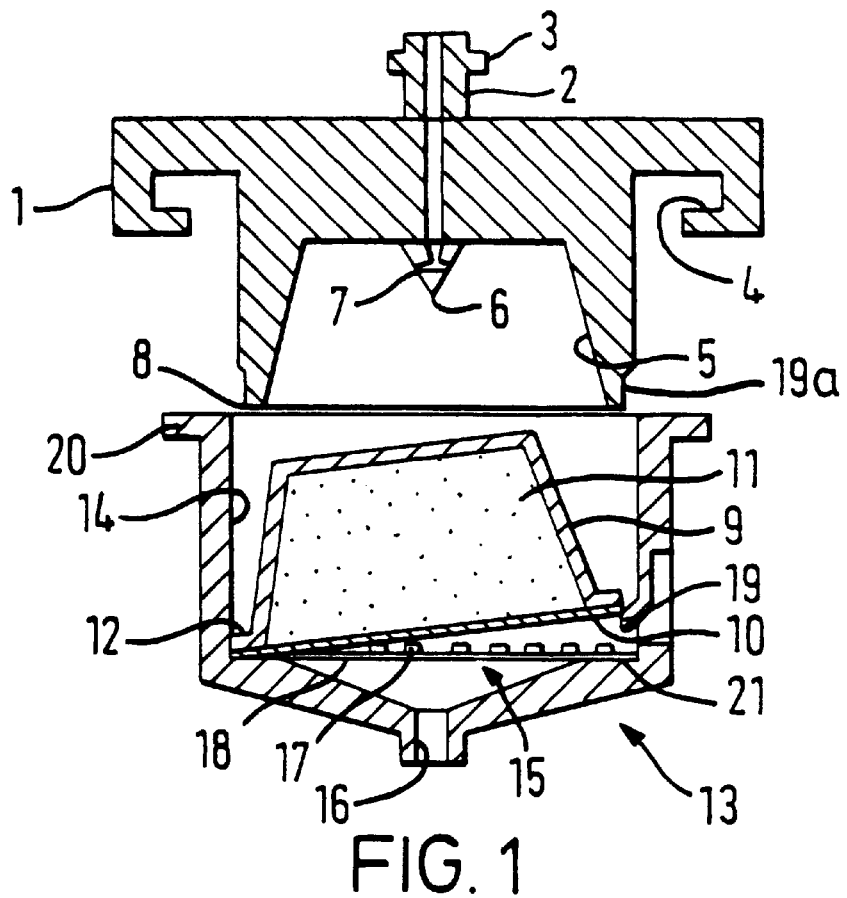
FIG. 1 is a simplified sectional view of the device according to the invention, in a first embodiment.
Figure 2:
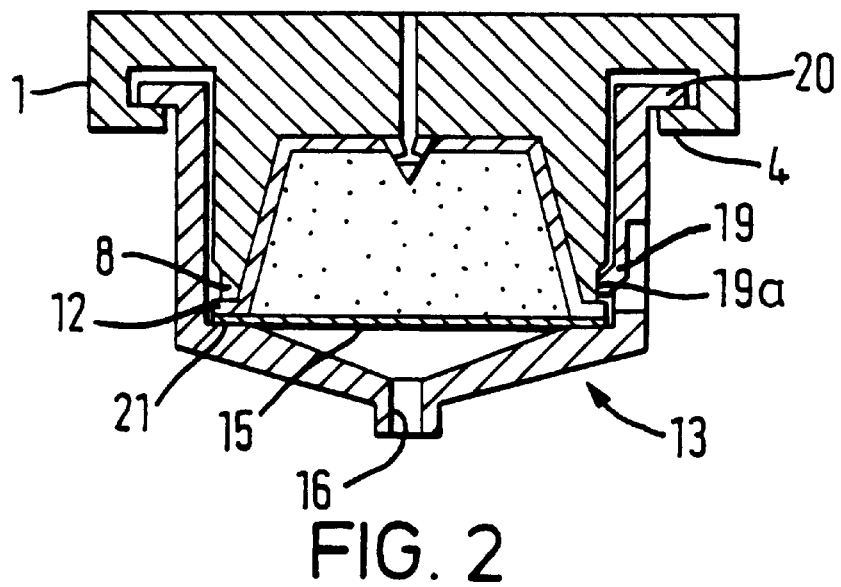
FIG. 2 is the same sectional view, but at the time of extraction.

The device according to the invention, as illustrated in FIGS. 1 and 2, comprises a housing (1) comprising a means (2) for linking with the water outlet (not shown) of the coffee machine, this linking means being of the bayonet type (3), and it is thus easily secured to the coffee machine as it is. This housing also comprises, on the periphery, tightening ramps (4), and a hollow part (5) which has a form which substantially matches the outer form of the capsule for extraction. The substantially cylindrical or frustonconical hollow part (5) comprises an annular edge (8) in its lower part. The hollow part finally comprises a water-injection member (6) pierced with upwardly facing holes (7).

The capsule for extraction comprises a cup (9), a cover (10) and a lip (12), and the cup sidewall extends to the cover and lip.

In operation, a capsule which contains roasted, ground coffee (11) is placed in the hollow of holder assembly (13) defined by the holder interior casing wall (14) of substantially cylindrical shape. The holder assembly includes a plate (15) for extraction which extends transversely with respect to the casing wall (14) so that the holder (13) has a base and which comprises raised elements (17) and hollow elements and holes (18) for the passage of the coffee drink. The holder assembly also comprises a hole (16), which allows the coffee drink extracted to be discharged into a cup during extraction of the coffee (11) contained by the capsule (9), and tightening lugs (20) are provided so as to engage in the tightening ramps (4) of the housing. In this embodiment, the holder assembly is a single component.

As already mentioned above, the object of the invention is to provide, inside the holder assembly, a means (19) for retaining the lip (12) of the capsule. This means extends from casing wall (14) slightly towards the center in relation to the cylindrical casing wall (14). Moreover, it must also extend lengthwise annularly with reference to the circumference of the casing wall (14) over a certain arc of a circle; and the arc of a circle thus defined must come to a compromise in order to satisfactorily hold the lip of the capsule and moreover, to guarantee that, after extraction, the lip may be released without too much difficulty and thus allow satisfactory ejection. Preferentially, an arc of a circle is chosen which is an arc which extends between 5° and 40°. Further, the extension towards the center may not exceed the width of the lip of the capsule.

In operation, the capsule (9) is placed in the holder assembly (13). The lip (12) of the capsule rests against the retention means (19). The holder assembly is then inserted via its tightening lugs (20) on the tightening ramp (4) of the housing (1). The lip (12) of the capsule is then forced past the retention means (19), this position being shown in FIG. 2. This can take place by virtue of the elasticity of the retention means (19). The machine is now ready for extracting the capsule. The seal is provided by the lip (12) of the capsule being pinched between the annular edge (8) of the housing and the perimeter (21) of the extraction plate (15). Further as will be seen from FIGS. 1 and 2, housing (1) has an outer wall portion perimeter (19a) which extends from the annular edge (8) and which is configured to accommodate positioning the retention means (19) in a type of male (19)/female (19a) relation.

Figure 3:
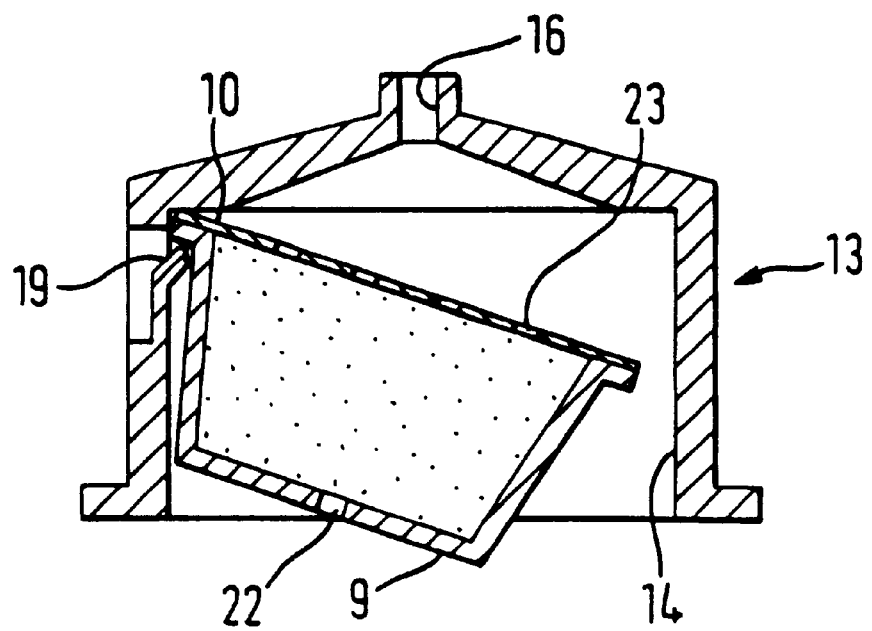
FIG. 3 is still the same sectional view at the moment of release (ejection) of the extracted capsule.

FIG. 3 shows only the holder assembly (13) at the moment of release (ejection) of the extracted capsule (9). To do this, the holder assembly is removed from the housing and turned over. As the retention means (19) extends only over a limited part of the circumference of the casing (14), the capsule is able to drop out of the casing (14) under gravity. In FIG. 3, the capsule is shown as including an opening (22) made by the water-injection member (6), and the cover (10) is torn along (23) over the raised elements (17).

Figure 5:
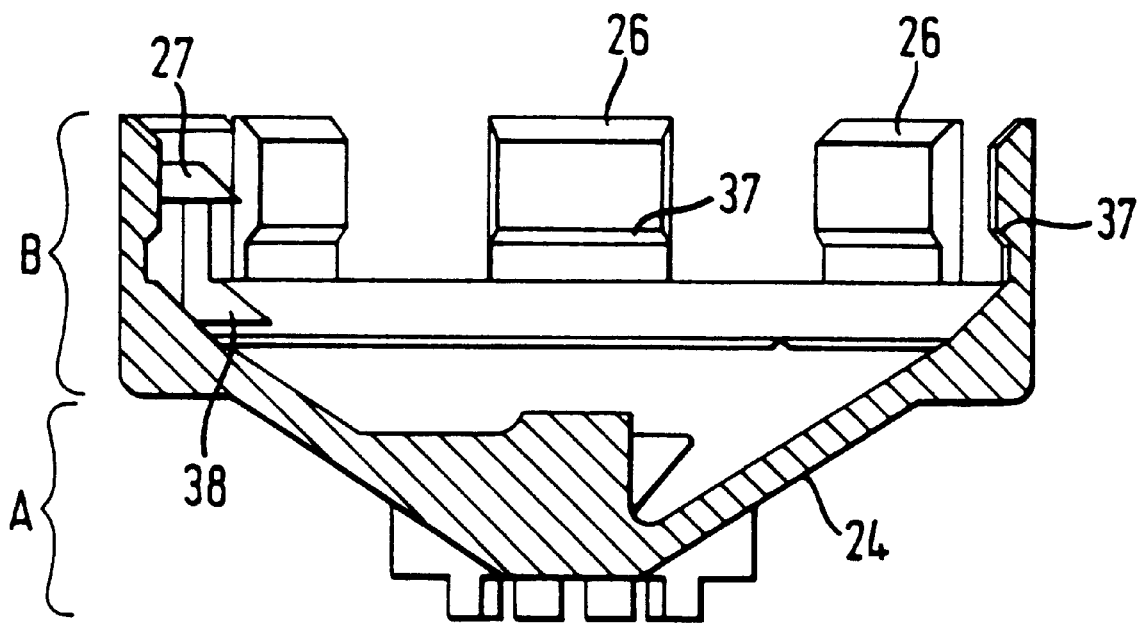
FIG. 5 is a sectional view of the support plate.
Figure 4:
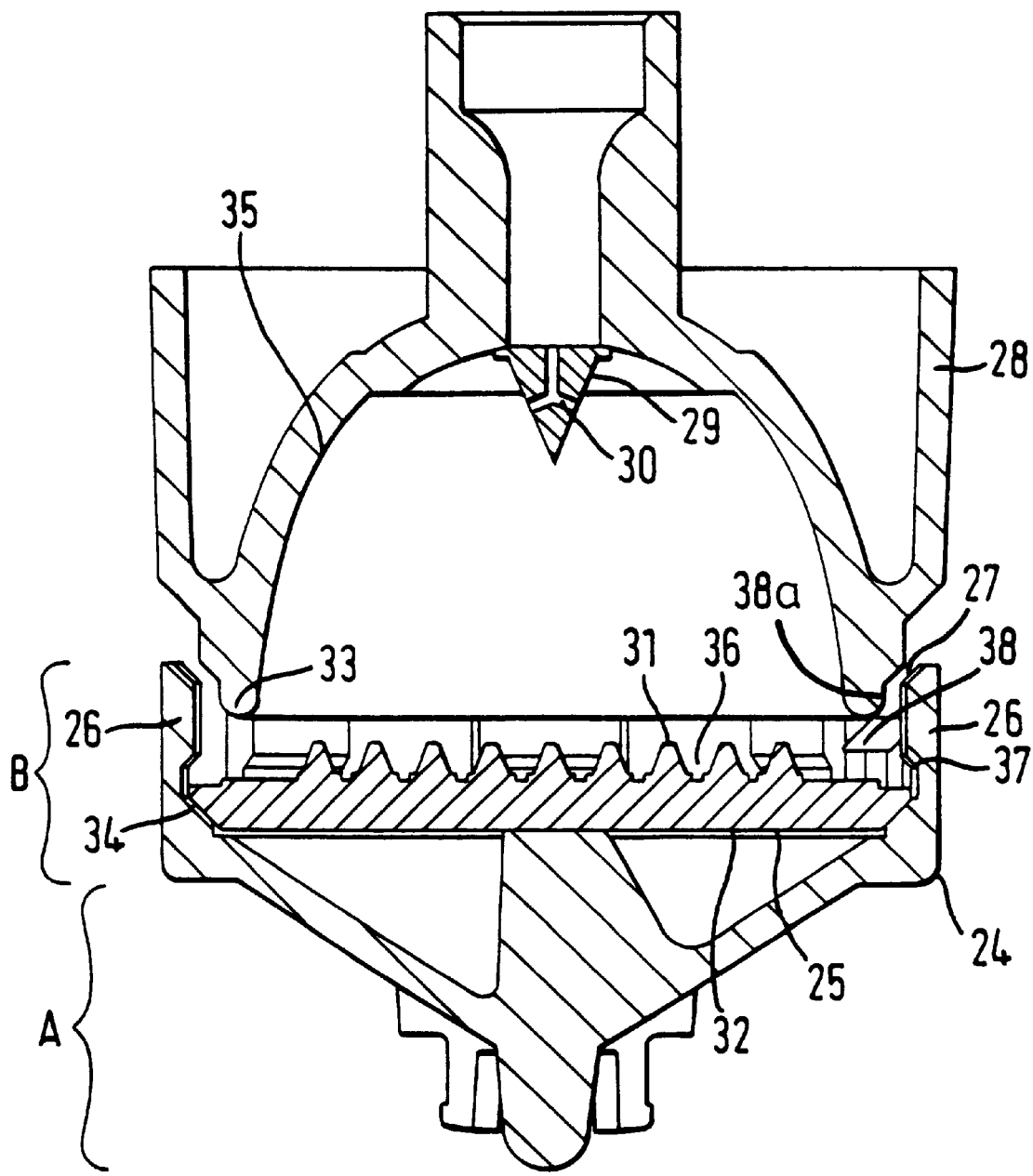
FIG. 4 is a simplified sectional view of the device according to a second embodiment of the invention.

FIG. 4 shows a second embodiment of the device according to the invention in which the holder assembly is in two parts, the figure showing only the plate support (24) and the extraction plate (25), and not showing the presence of a capsule for extraction. The housing (28) comprises the casing (35) for the capsule used for extraction, as well as the water-injection member (29) with the holes (30) and an annular edge (33). The extraction plate (25) comprises the raised elements (31) and the hollowed-out elements (36). The hollowed-out elements contain the holes (32) which allow the passage of the extracted drink, such as coffee. The annular edge (33) of the cylindrical body interacts with the perimeter (34) of the extraction plate (25) in order to guarantee the seal during extraction, and in this embodiment, too, housing (35) has an outer wall portion perimeter (38a) which extends from the annular edge (33) and which is configured to accommodate positioning the retention means (38) in a type of male (38)/female (38a) relation. As also illustrated in FIG. 4 and more particularly in FIG. 5, the plate support (24) comprises a lower conical part A and an upper cylindrical part B. The part B is made so as to be accommodated in the holder as it is. The part B comprises holding lugs (26) and (27) which are uniformly distributed over the ring of the plate support (24). The lugs (26) include a stop (37) permitting holding of the extraction plate (25) in the casing of the holder assembly. The lugs (27) include the means (38) for retaining the capsule lip. It is possible to have either one or two of these retention means. The retention means (38) of FIGS. 4 and 5 forms an arc of a circle with an angle "x". In the present case, this angle is 20°.

Figure 6:
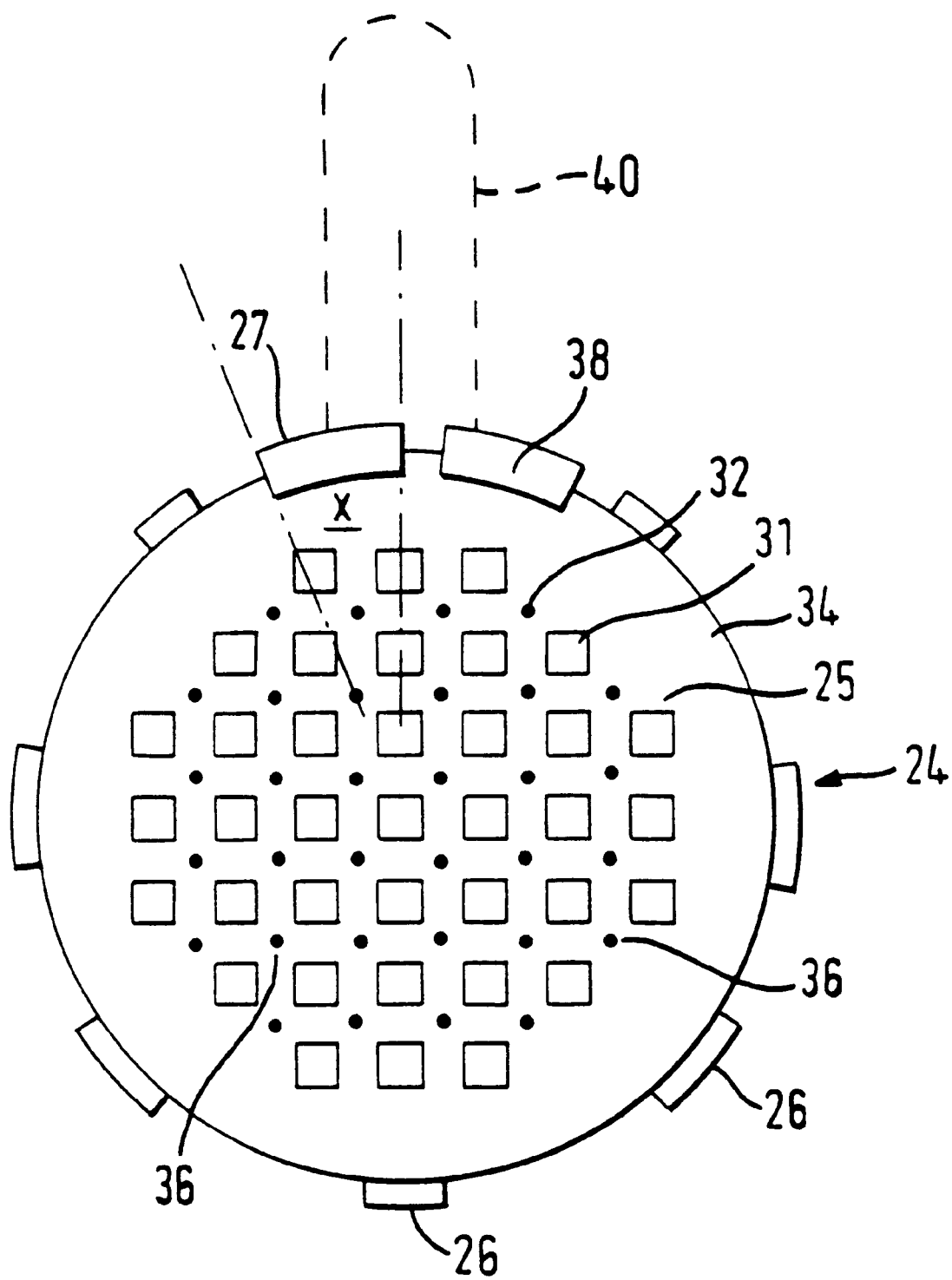
FIG. 6 is a top view of the support in FIG. 5 with the extraction plate.

FIG. 6 is a diagrammatic top view which illustrates the plate support (24) and the extraction plate (25). The plate (25) comprises a perimeter (34) guaranteeing the seal during extraction. This figure also illustrates seven holding lugs (26) and two holding lugs (27) and two retention means (38). A handle (40) of the holder assembly is indicated by the dashes of the figure. Normally, the retention means (38) are arranged opposite the handle (40) so as to guarantee satisfactory release of the capsules both in the case of right-handed and left-handed users.

Finally, FIG. 7, shows an exploded illustration of a third embodiment of the device according to the invention, and FIG. 8 further illustrates the holder of FIG. 7. These figures illustrate the entire device composed of the housing (41) comprising a water-injection member (53) and tightening ramps (51), and the holder (42) and the cartridge (capsule) (43) for extraction. The holder (42) comprises the handle, the casing (45), the extraction plate (46) and the tightening lugs (52) provided so as to engage on the tightening ramp (51). The lower part of the casing (45) comprises a rim (47) forming the means for retaining the lip (48) of the cartridge (43). The extraction plate (46) comprises raised elements (40) and holes (50) which provide for opening the cartridge for obtaining the extracted drink, such as coffee, to pass through during extraction from the capsule (43).

It will be seen also in FIG. 8 that the rim (47) extends on either side of the handle (44). This rim must not extend over an arc of a circle of more than 180° and preferably extends over an arc of a circle with an angle of approximately 90°. The advantage of the version of FIGS. 7 and 8 is simplicity. The holder (42) can be produced by injection, as a single piece. The injected material is either a metal, for example aluminum, or a hard, rigid plastic.

We claim:

1. In devices comprising an assembly for holding and positioning capsules containing a substance to be extracted for preparation of a drink, wherein the capsules comprise a cup, a cover and a lip and wherein the cup sidewall extends to the cover and lip, wherein the devices comprise a hollowed housing device and a hollowed holder device and wherein the housing device is configured for containing a capsule during extraction under pressure and so that it is connectable with and comprises means for receiving water from a pressure extraction machine and comprises a member for injecting water into the capsule for extraction of the substance in the capsule under pressure and wherein a holder device comprises an annular casing wall which defines a hollowed holder device interior configured for circumscribing the cup lip and at least a portion of the cup sidewall, the improvements comprising:

an extraction plate wherein the extraction plate is configured with hole portion openings and is positioned so that the plate extends transversely with respect to the casing wall and so that the holder device has a base which encloses the hollowed interior for flow of extracted drink obtained from the substance contained by the capsule, and wherein the holder device further comprises means which extends from the casing wall into the hollowed interior at a position for retaining a capsule lip so that upon placement of a capsule in the holder device hollowed interior so that the cover and lip are adjacent the extraction plate, the lip passes by the retention means and is retained between the retention means and the extraction plate and wherein the housing device is configured for engagement in the holder device so that a housing device wall extends to an annular periphery edge positionable adjacent the casing wall and for contacting the capsule lip so that a seal is formed during pressure extraction.

2. Devices according to claim 1 wherein the housing device wall has a portion perimeter which extends from the periphery edge and which is configured to accommodate positioning of the retention means.

3. Devices according to claim 1 or 2 wherein the retention means is elastic so that upon placement of a capsule in the holder, the retention means deforms for placing a capsule lip adjacent the extraction plate and so that the lip becomes positioned between the extraction plate and the retention means.

4. Devices according to claim 1 or 2 wherein the retention means comprises two lugs and wherein each lug has a length which forms an arc of a circle.

5. Devices according to claim 4 wherein the lug arc extends for less than 30°.

6. Devices according to claim 4 wherein the lug arc extends for less than 10°.

7. Devices according to claim 3 wherein the retention means comprises two lugs and wherein each lug has a length which forms an arc of a circle and wherein the lug arc extends for less than 30°.

8. Devices according to claim 1 or 2 wherein the retention means comprises a rim which has a length which forms an arc of a circle and extends for less than 180°.

9. Devices according to claim 3 wherein the retention means comprises a rim which has a length which forms an arc of a circle and extends for less than 180°.

10. Devices according to claim 1 or 2 wherein the extraction plate further comprises raised elements for tearing holes in the cover of a capsule under extraction pressure.

11. Devices according to claim 1 further comprising a plate support connected with the holder device.

12. Devices according to claim 1 wherein the holder device is made of a plastic material.

13. Devices according to claim 1 wherein the housing device is made of a plastic material.

14. Devices according to claim 1 wherein the housing means for receiving water comprises a bayonet system.

* * * * *

UNITED STATES PATENT AND TRADEMARK OFFICE
CERTIFICATE OF CORRECTION

PATENT NO. : 6, 026, 732
DATED : February 22, 2000
INVENTOR(S) : Alexandre KOLLEP, *et al.*

It is certified that error appears in the above-identified patent and that said Letters Patent is hereby corrected as shown below:

In line 1 of claim 1 (column 5, ~ line 43), delete "devices comprising" and then, after "assembly", insert -- for preparation of a drink and which comprises devices --.

In line 1 of each of claims 2 - 14 (at column 6), delete "Devices" and insert therefor -- An assembly --.

Signed and Sealed this

Sixth Day of March, 2001

Attest:

NICHOLAS P. GODICI

*Attesting Officer*  *Acting Director of the United States Patent and Trademark Office*